US007983452B2

(12) United States Patent
Chaney et al.

(10) Patent No.: US 7,983,452 B2
(45) Date of Patent: Jul. 19, 2011

(54) USING A SURFACE BASED COMPUTING DEVICE FOR VERIFICATION OF AN IDENTIFICATION DOCUMENT

(75) Inventors: Craig W. Chaney, Apex, NC (US); Travis M. Grigsby, Austin, TX (US); Christopher M. Laffoon, Durham, NC (US); Kathryn J. Lemanski, Raleigh, NC (US); Viswanath Srikanth, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1002 days.

(21) Appl. No.: 11/841,276

(22) Filed: Aug. 20, 2007

(65) Prior Publication Data
US 2009/0052751 A1 Feb. 26, 2009

(51) Int. Cl.
*G06K 9/00* (2006.01)
(52) U.S. Cl. ........................................ 382/115; 382/100
(58) Field of Classification Search .................. 382/115
See application file for complete search history.

(56) References Cited

U.S. PATENT DOCUMENTS

| | | | | | |
|---|---|---|---|---|---|
| 4,048,618 | A | * | 9/1977 | Hendry | 382/124 |
| 4,817,166 | A | * | 3/1989 | Gonzalez et al. | 382/105 |
| 5,081,685 | A | * | 1/1992 | Jones et al. | 382/105 |
| 5,513,272 | A | * | 4/1996 | Bogosian, Jr. | 382/116 |
| 5,675,662 | A | * | 10/1997 | Deaton et al. | 382/137 |
| 5,742,685 | A | * | 4/1998 | Berson et al. | 713/186 |
| 5,838,814 | A | * | 11/1998 | Moore | 382/115 |
| 5,859,920 | A | * | 1/1999 | Daly et al. | 382/115 |
| 6,148,091 | A | * | 11/2000 | DiMaria | 382/115 |
| 6,185,316 | B1 | * | 2/2001 | Buffam | 382/115 |
| 6,224,109 | B1 | * | 5/2001 | Yang | 283/77 |
| 6,389,151 | B1 | * | 5/2002 | Carr et al. | 382/100 |
| 6,463,416 | B1 | * | 10/2002 | Messina | 705/1.1 |
| 6,523,741 | B1 | * | 2/2003 | DiMaria et al. | 235/375 |
| 6,785,405 | B2 | * | 8/2004 | Tuttle et al. | 382/112 |
| 7,039,214 | B2 | * | 5/2006 | Miller et al. | 382/100 |
| 7,233,690 | B2 | * | 6/2007 | Lacy | 382/137 |
| 7,244,043 | B2 | * | 7/2007 | Monk et al. | 362/239 |
| 7,260,237 | B2 | * | 8/2007 | Nishimoto et al. | 382/100 |
| 7,269,275 | B2 | * | 9/2007 | Carr et al. | 382/100 |
| 7,281,657 | B2 | * | 10/2007 | Patel et al. | 235/454 |
| 7,295,339 | B2 | * | 11/2007 | Kobayashi et al. | 358/1.18 |
| 7,346,184 | B1 | * | 3/2008 | Carr et al. | 382/100 |
| 7,350,707 | B2 | * | 4/2008 | Barkan et al. | 235/454 |
| 7,478,067 | B2 | * | 1/2009 | Messina | 705/50 |
| 7,639,837 | B2 | * | 12/2009 | Carr et al. | 382/100 |
| 7,708,189 | B1 | * | 5/2010 | Cipriano | 235/375 |
| 2003/0128866 | A1 | * | 7/2003 | McNeal | 382/115 |
| 2004/0081332 | A1 | * | 4/2004 | Tuttle et al. | 382/100 |
| 2005/0125351 | A1 | * | 6/2005 | Tidwell et al. | 705/42 |

(Continued)

*Primary Examiner* — Sath V Perungavoor
(74) *Attorney, Agent, or Firm* — Patents on Demand, P.A.; Brian K. Buchheit; Scott M. Garrett

(57) ABSTRACT

The current invention discloses a solution for using a surface based computing device for verification of an identification document, such as a driver's license. A surface based computing device can be a device capable of scanning an identification document, comparing the scanned document against a set of conditions for a valid document, and reporting comparison results. A secured resource can be granted based at least in part upon identity verifications conducted by the surface based computing device. The surface based computing device can include a MICROSOFT SURFACE device or any other computing device able to scan an identification document and to process scanned results. In one embodiment, the surface based computing device can be used in conjunction with a human agent for added security.

19 Claims, 3 Drawing Sheets

U.S. PATENT DOCUMENTS

| | | | |
|---|---|---|---|
| 2005/0207614 A1* | 9/2005 | Schonberg et al. | 382/100 |
| 2005/0228689 A1* | 10/2005 | Hagood | 705/1 |
| 2007/0204162 A1* | 8/2007 | Rodriguez | 713/176 |
| 2007/0204164 A1* | 8/2007 | Cattrone et al. | 713/176 |

* cited by examiner

USING A SURFACE BASED COMPUTING DEVICE FOR VERIFICATION OF AN IDENTIFICATION DOCUMENT

BACKGROUND

1. Field of the Invention

The present invention relates to the field of surface based computing and, more particularly, to using a surface based computing device for verification of an identification document.

2. Description of the Related Art

Security measures involving identifying documents are used to access goods, services, secured regions, and the like. For example, alcohol distribution is age restricted and alcohol purchasers are required to show a driver's license or other photo identification that verifies their age at a time of sale. In another example, night clubs are commonly age restricted and only grant entry to people that meet the age requirement, as verified by an identifying document (e.g., driver's license). Many test taking facilities, such as facilities administering Scholastic Aptitude Tests (SAT) or American College Test (ACT) tests, require test takers to produce a valid photo identification document to verify that the person actually taking a test is a person receiving credit for the test results.

In conventional security situations, a human agent is involved in the verification process. Use of humans to verify identifying documents is inherently flawed for multiple reasons. First, human agents can be bribed to overlook a flawed identification document, such as when a cashier is paid excessive amounts for alcohol by a minor. Even if there are no bribes are involved, humans are generally not skilled at verifying a legitimacy of identifying documents, especially when the documents are from a state or a country other than the one the human agent is in. More specifically, a human agent is generally not very good at knowing whether items within an identifying document are positioned correctly, even though incorrect or inexact positioning of items is common for fake identifying documents. What is needed is a convenient, more secure way to verify identity which is not solely dependent on human verification.

SUMMARY OF THE INVENTION

The current invention discloses a solution for using a surface based computing device for verification of an identifying document, such as a driver's license. A surface based computing device can be a device capable of scanning an identifying document, comparing the scanned document against a set of conditions for a valid document, and reporting comparison results. A secured resource can be granted based at least in part upon identity verifications conducted by the surface based computing device. The surface based computing device can include a MICROSOFT SURFACE device or any other computing device able to scan an identifying document and to process scanned results. In one embodiment, the surface based computing device can be used in conjunction with a human agent for added security.

The present invention can be implemented in accordance with numerous aspects consistent with the material presented herein. For example, one aspect of the present invention can include a method of granting access to a secured resource based upon verifying an identification document. The method can include a step of identifying an identification document placed on a surface based computing device. The surface based computing device can digitally encode information from the identification document. The digitally encoded information can be analyzed to determine a type of the identification document. Features for the determined type of identification document can be retrieved from a data store. The digitally encoded information can be compared against the retrieved features to determine a compatibility score. When the compatibility score exceeds a previously established threshold, the identification document can be verified as authentic. When the compatibility score does not exceed the previously established threshold, the identification document can remain unverified. Verified identification documents can be utilized to grant a related user access to a secured resource. In one embodiment, a human verification agent can be required to verify the identification document before access is granted to the secured resource.

Another aspect of the present invention can include a surface based computing device that includes a scanning device, an identification engine, and a user interface. The scanning device can scan an identification document. The identification engine can analyze an identification document scanned by the scanning device to determine a validity of the scanned document by comparing features of the scanned identification document against features of an identification document template for a document of a same type as the scanned identification document. The user interface can present verification results of the analysis performed by the identification verification engine. The verification results can be utilized to selectively grant access to a secured resource.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
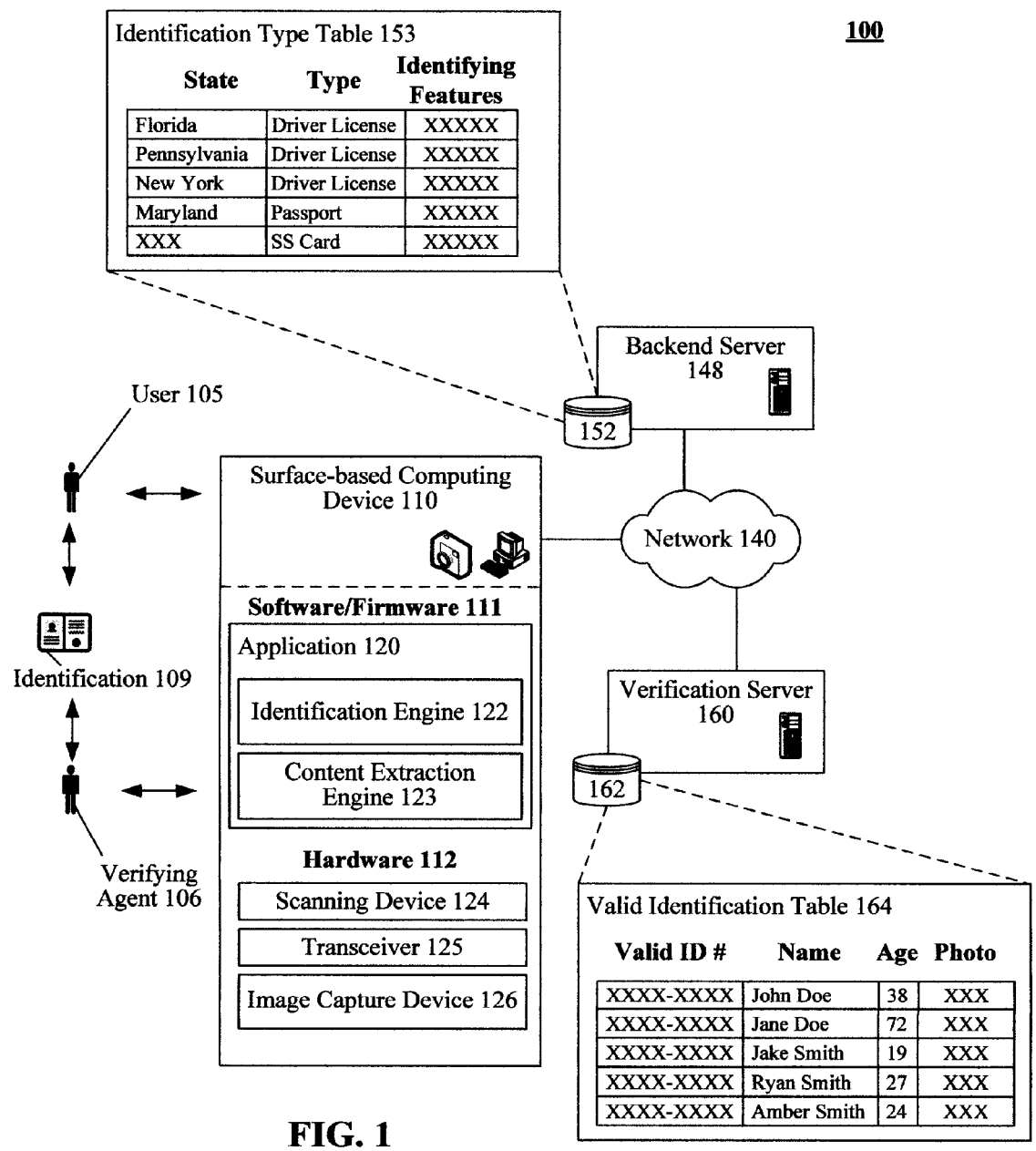
FIG. 1 is a schematic diagram of a system for using a surface based computing device for verification of an identification document.

FIG. 1 is a schematic diagram of a system 100 for using a surface based computing device 110 for verification of an identification document 109. The identification document 109 can be provided for access to a secured resource. Standard identification documents 109 include a driver's license, social security card, state ID, a birth certificate, a military ID, a passport, and the like. The secured resource can be an age restricted good (e.g., alcohol, tobacco, etc.), can be a restricted access area (e.g., a movie theater, a nightclub, etc.), can be a transaction verification event (e.g., identity verification for a check, credit card, debit card use or for test taking purposes, etc.), and the like. The automated identity verification performed by the device 110 can be an exclusive system for verifying the identification document 109 or can be a supplemental mechanism used in conjunction with a human verifying agent 106.

In system 100, a user 105 can position the identification document 109 near the device 110 so that an included or attached scanning device 124 can function. Data obtained from the scanning device 124 can be processed by the identification engine 122 to determine a type of identification document 109 scanned. Once a type is determined, a data store 152 can be consulted (i.e., table 153) to determine exact features that the identification document 109 is to have. For example, a Florida Driver's License has different features arranged in a different manner than a New York Driver's License, or a Maryland Passport. Additionally, an automated device 110 is better at identifying differences in spatial arrangements than is a human agent 106. The data store 152 can be managed by a backend server 148 remote from device 110 connected via network 140 or can be a data store of the device 110, which is periodically updated from a remote source (e.g., data store 152).

In one implementation, a user 105 can be verified for a completely automated transaction based upon results of the feature comparison, which can be combined with a number of other optional verification techniques in order to increase system 100 accuracy. In a different implementation, a verifying agent 106 can also be involved in the identification document 109 verification process. The human agent 106 can monitor interaction between user 105 and the device 110 to minimize the ability of user 105 to deceive the device 110. The agent 106 can also inspect the identification document 109 to validate other aspects, which are difficult for automated components of system 100 to detect. Such aspects can include document 109 texture, color, and the like. Additionally, many identification documents 109 incorporate anti-forgery elements, such as holograms, which are difficult to reproduce, difficult for many automated systems to detect, yet easy for a human agent 106 to discern. Further, the human agent 106, who may not be familiar with details of the identification document 109 can be presented with information from the device 110, such as a sample picture of what the document 109 should look like, which can be obtained from table 153. In one embodiment, the agent 106 can be prompted to examine specific elements of the document 109, such as looking for a hologram on the top right corner or looking for a magnetic strip on the back of the document.

As noted, the device 110 can implement numerous optional additional verification processes. These additionally verification procedures can be performed for each identification document 109 verification event, can be randomly performed as a safety measure within system 100 to keep users 105 "honest", and/or can be selectively performed for abnormal transactions. An abnormal transaction can, for example, be an attempted purchase of a thousand dollars worth of alcohol, as opposed to a six pack of beer.

One such optional verification process uses an image capture device 126 to capture an image of user 105. This image can be compared against an image contained in the identification document 109. A captured image of the user 105 can also be compared against a stored image accessible by device 110 for the user 105. The image capture device 126 can be situationally supplemented with any number of biometric input devices, such as a finger print reader, a voice print analyzer, and the like, depending on an amount of security desired for the system 100. In one embodiment, users 105 can be required to register before using device 110, where user 105 images and other biometric data is captured during the registration process for later use. The additional verification elements are not limited to biometrics, and pass codes, personal identification numbers (PINS), and the like can also be used.

Other optional verification processes can compare content from the document 109 extracted by content extraction engine 123 against an authority source. The authority source is indicated as a remotely located verification server 160 attached to the device 110 via network 140. Server 160 can include a data store 162, which can maintain a valid identification table 164. For example, the verification server 160 can be a Department of Motor Vehicle (DMV) server, which maintains access to driver's license information for every license carrier. Content extracted from the scanned document 109 can be compared against equivalent elements in the table 164. For example, when no valid driver's license number is found in table 164, then the identification engine 122 can infer that the presented identification document 109 is not authentic. Similarly, attributes, such as an age attribute from the scanned document 109 can be compared against an equivalent element of table 164 to ensure the document 109 contains valid information.

In system 100, a surface based computing device 110 can be any device able to scan an identification document 109 at a security junction, which is able to access a validity of the scanned document 109 so that a secured resource is optionally released to the user 105 depending on processing results. The surface based computing device 110 can be a surface able to recognize physical objects, including an identification document 109, and to perform programmatic actions including verification/security actions pertaining to the document 109 involving the physical object. A surface based computing device 110 can be an enhancement of an otherwise ordinary tabletop which changes the "tabletop surface" into a vibrant, dynamic surface that provides effortless interaction with digital content through natural gestures, touch and physical objects. Surface computing device 110 integrates a variety of input and detection devices to permit "intuitive" interactions that do not involve traditional input devices, such as a mouse and keyboard. One implementation of a surface based computing device 110 is produced by MICROSOFT and is referred to presently as MICROSOFT SURFACE. The surface based computing device 110 is not limited to implementation specifics of the MICROSOFT SURFACE standard, but includes any set of standards, which together form a surface computing device. Software/firmware 111 of device 110 can include an identity verification application 120, which includes an identification engine 122 and/or a content extraction engine 123. Hardware 112 of device 110 can include the scanning device 124, a transceiver 125 for network 140 communications, and/or an image capture device 126.

Scanning device 124 can be any device capable of visually capturing details of identification 109 and encoding the captured details in a digital form for later processing. The scanning device 124 can utilize any scanning technology, such as optical character recognition (OCR) techniques, to extract meaning from the document 109.

The data stores 152, 162 can be physically implemented within any type of hardware including, but not limited to, a magnetic disk, an optical disk, a semiconductor memory, a digitally encoded plastic memory, or any other recording medium. Each of the data stores 152, 162 can be a stand-alone storage unit as well as a storage unit formed from a plurality of physical devices which may be remotely located from one another. Additionally, information can be stored within the data stores 152, 162 in a variety of manners. For example, information can be stored within a database structure, such as table 153 and 164 information, or can be stored within one or more files of a file storage system where each file may or may not be indexed for information searching purposes. Information stored in data stores 152, 162 can also be optionally encrypted for added security.

The network 140 can include components capable of conveying digital content encoded within carrier waves. The content can be contained within analog or digital signals and conveyed through data or voice channels and can be conveyed over a personal area network (PAN) or a wide area network (WAN). The network 140 can include local components and data pathways necessary for communications to be exchanged among computing device components and between integrated device components and peripheral devices. The network 140 can also include network equipment, such as routers, data lines, hubs, and intermediary servers which together form a packet-based network, such as the Internet or an intranet. The network 140 can further include circuit-based communication components and mobile communication components, such as telephony switches, modems, cellular communication towers, and the like. The network 140 can include line based and/or wireless communication pathways.

Figure 2:
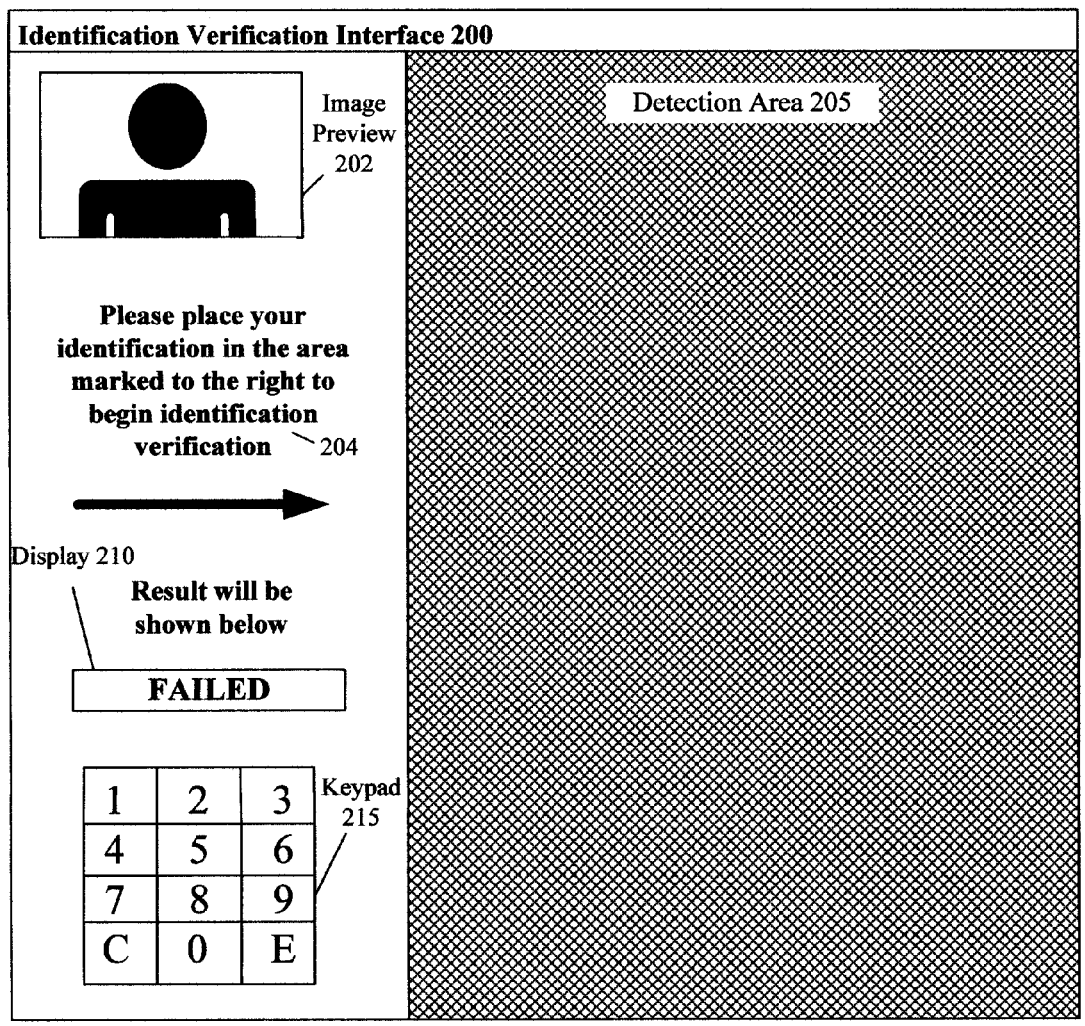
FIG. 2 illustrates an application interface of a surface based computing device used to verify of an identifying document in accordance with an embodiment of the inventive arrangements disclosed herein.

FIG. 2 illustrates an application interface 200 of a surface based computing device used to verify of an identification document in accordance with an embodiment of the inventive arrangements disclosed herein. The interface 200 can be one contemplated interface for the surface based computing device 110 of system 100. The displayed elements of interface 200 are for illustrative purposes only and adaptations, rearrangements, and modifications of the interface 200 are to be considered within the scope of the disclosed invention.

The interface 200 can request 204 a user to present an identification document within a designated detection area 205 of a surface-computing device. Once placed in the detection area 205, the identification document can be scanned and processed. Results of the processing can be displayed 210 to a user along with additional requirements as necessary. Additional verification information may be required in some embodiment, which a user can provide through any suitable input mechanism, such as keypad 215 for a PIN, a finger print reader for a fingerprint, and the like. When a user's image is captured, the image can be played back to the user in image preview 202. A user can be informed that their image 202 is stored for a period of time until the transaction occurring via interface 200 has been successfully verified. Additionally, measures can be taken to ensure the image 202 is not easily faked, such as through use of a photograph or other still. For example, the surface based computing device can require the image in preview 202 to change over time, such as in a manner consistent with images that change when users currently utilize a Web-camera or other such image capture device.

Figure 3:
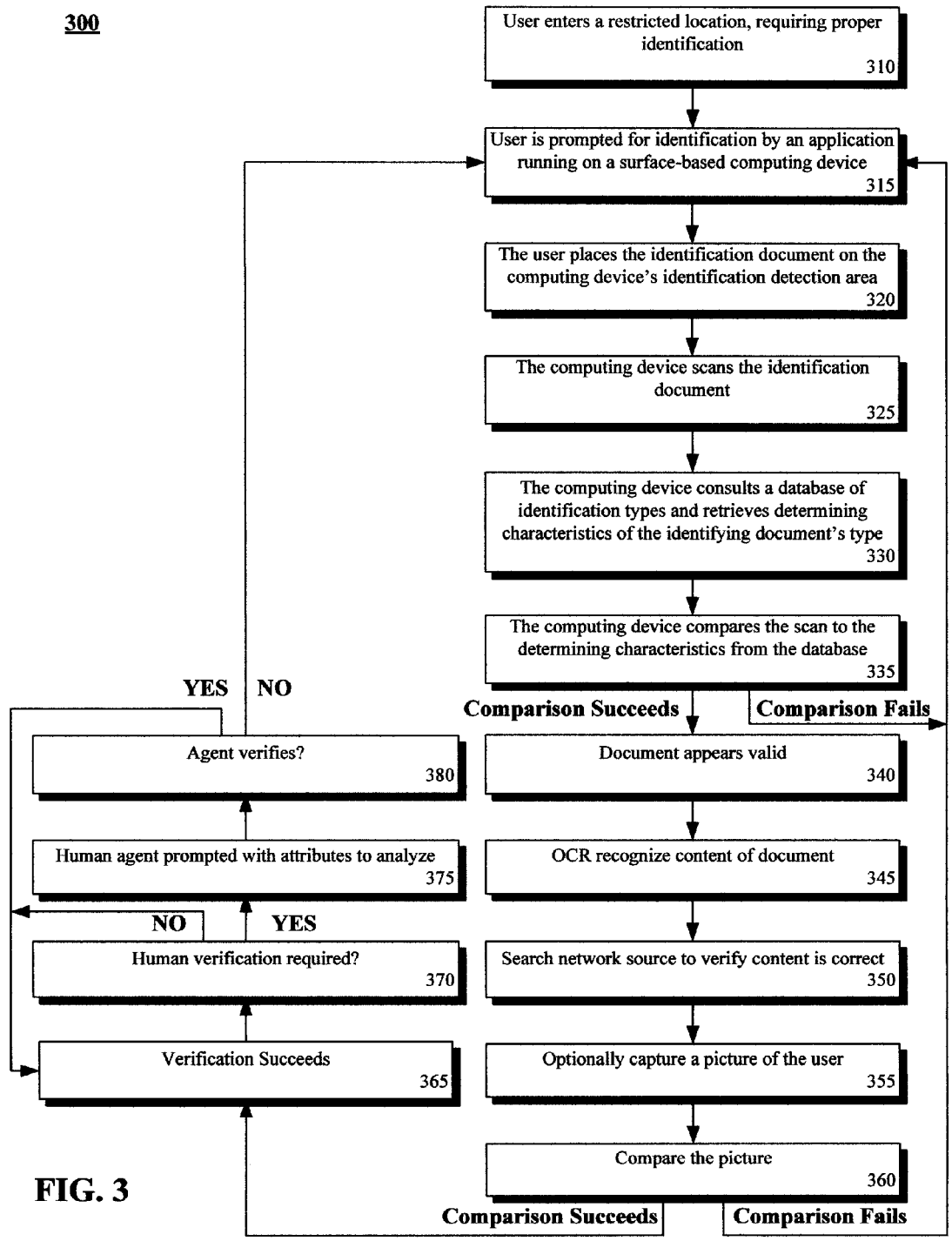
FIG. 3 is a flow chart of a method for using a surface based computing device for verification of an identifying document.

FIG. 3 is a flow chart of a method 300 for using a surface based computing device for verification of an identification document. Method 300 can begin in step 310, where the user can enter a restricted location which can require proper identification. In step 315, the user can be prompted for identification by an application running on a surface based computing device. In step 320, the user can place the identification document on the computing device's identification detection area.

In step 325, the computing device can scan the identification document. In step 330, the computing device can consult a database of identification types and retrieve determining characteristics of the identification document's type. The consulted database can be located on the surface base computing device, on a peripheral data store connected to the computing device, or on a network data store linked to the computing device. The type of document can be automatically determined by the computing device using recognition technologies such as optical character recognition (OCR) after scanning the document and extracting text from the document. For example, step 330 can determine a scanned document is an Ohio driver's license. In step 335, the computing device can compare the scan's results to the database derived characteristics. For example, when the scanned identification was determined to be an Ohio driver's license, the characteristics returned from the database can specify the elements, element arrangements, and relative positions of elements that are appropriate for an Ohio driver's license, which is compared against the scanned identification.

In step 335, if the comparison fails, method 300 can return to step 315, where the user can be prompted again for identification by an application running on a surface based computing device. The method 300 repeats back to step 315 to ensure the document was properly placed upon the surface based device during the scan. After a number of incorrect attempts, the scanning attempt can fail and access to a secured resource can be denied. In step 335, if the comparison succeeds, method 300 can continue to step 340, where the document can appear to be valid.

In step 345, the computing device can use optical character recognition (OCR) to recognize the content of the document. In step 350, the computing device can search a network source to obtain content associated with the identification document and the scanned content can be compared against the content from the source. For example, a Department of Motor Vehicle (DMV) database can be searched to ensure a scanned driver's license number is valid and is associated with an individual specified by the scanned documents. Other scanned attributes, such as date of birth, can also be validated against content contained in a validation source (e.g., DMV database).

In step 355, the computing device can optionally capture a picture of the user, using an image capturing device. In step 360, the acquired picture can be compared to a photo stored over a network source and/or a photo included in the scanned document. If in step 360, the comparison fails, method 300 can return to step 315, where the user can be prompted again for identification from a surface based computing device.

If in step 360 the comparison succeeds, method 300 can continue to step 365, where the automated verification can succeed. In step 370, additional human verification can be optionally required. For example, humans are particularly good at identifying a texture and "face validity" of an identification document, which an automated system may not be able to discern. If in step 370 human verification is not required, method 300 can return and end in step 365, where the verification can succeed.

If in step 365, human verification is required, method 300 can continue to step 375, where a human agent can be optionally prompted with the attributes of the identification document to analyze. For example, a human agent can be shown a valid identification document of a type similar to that produced, where elements to check, such as holographic elements, are highlighted. In step 380, the agent can attempt to verify the attributes or otherwise verify the identification document. If in step 380, the agent verifies the identification as valid, method 300 can return and end in step 365, where the document can be successfully verified. If in step 380, the agent does not verify the identification as valid, method 300 can return to step 315, where the user can be prompted again to use the surface based computing device to identify the document (or a different identification document).

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method of granting access to a secured resource based upon verifying an identification document comprising:
   identifying an identification document placed on a surface based computing device, wherein the surface based computing device lacks keyboard and mouse peripherals for interactions, wherein said surface based computing device includes a graphical user interface comprising a detection area for presenting the identification document for scanning and an input mechanism comprising a plurality of user selectable, touch-sensitive keys, each of the keys comprising an alpha-numeric label representing an input character received when a user touches the corresponding key;
   capturing an image of a user presenting the identification document;
   the surface based computing device digitally encoding information from the identification document, by scanning the identification document once it is placed in the detection area;
   analyzing the digitally encoded information to determine a type of the identification document;
   retrieving features for the determined type of identification document from a data store;
   comparing the digitally encoded information against the retrieved features to determine a compatibility score;
   comparing the image of the user against an image contained within the digitally encoded information;
   when the compatibility score exceeds a previously established threshold, verifying the identification document as authentic; and
   when the compatibility score does not exceed the previously established threshold, determining that the identification document is not verified, wherein verified identification documents are utilized to grant a related user access to a secured resource; and
   basing the granting of access to the secured resource upon comparison results of the captured image of the user and the image from the identification document as well as input received via the input mechanism.

2. The method of claim 1, wherein the identification document includes a birth date, wherein the secured resource is an age restricted resource, and wherein the data store comprising the features for the determined type of identification document is from an authority source comprising a remotely located verification server that maintains information for a government agency specific to the identification document.

3. The method of claim 2, wherein the secured resource is associated with a purchase attempt of at least one of alcohol and tobacco.

4. The method of claim 1, wherein the secured resource is an authentication action for a negotiable instrument, wherein said negotiable instrument comprises at least one of a check, a credit card, and a debit card.

5. The method of claim 4, wherein content contained in the digitally encoded information is compared against content of the negotiable instrument to verify that a negotiable instrument user is the same user as that associated with the identification document.

6. The method of claim 1, further comprising:
   requiring a human verification agent to verify the identification document before granting access to the secured resource; and
   presenting the human verification agent with verifying instructions for the identification document, wherein said verifying instructions are based upon the retrieved features.

7. The method of claim 6, further comprising:
   presenting a sample image from the data store of a proper valid document of the determined type to the human verification agent so that the human verification agent is able to compare the sample image against the identification document.

8. The method of claim 1, wherein measures are taken to ensure that the captured image of the person changes over time in a manner consistent with use of a Web camera or other such image capture device to capture an image of a live person present who is having their image captured via the Web camera or other image capture device.

9. The method of claim 1, further comprising:
   retrieving information related to the identification document from a remotely located authority source;
   comparing the retrieved information against the digitally encoded information from the identification document; and
   basing the granting of access to the secured resource upon comparison results of the retrieved information and the digitally encoded information from the identification document.

10. The method of claim 1, wherein the surface based computing device is a Point of Sale (POS) device.

11. The method of claim 1, wherein the surface based computing device is a device located at or within tables of an alcohol serving establishment, wherein the identification document comprises a birth date, and wherein the secured resource is associated with a purchase attempt of alcohol.

12. The method of claim 1, wherein the surface based computing device is integrated within a surface used for a non-computing purpose, wherein the surface based computing device automatically detects when the identification document is placed upon the surface specifically placed within the detection area, which initiates the digitally encoding step.

13. The method of claim 6, further comprising:
prompting the human verification agent responsive to the analyzing the digitally encoded information to examine specific elements of the identification document to validate specific aspects of the identification document that are difficult for automated components of a system to detect, yet that are relatively easy for the human verification agent to discern.

14. The method of claim 1, wherein the identification document is a driver's license and wherein the data store from which the features were retrieved is a data store of a Department of Motor Vehicle (DMV) server.

15. A surface based computing device comprising:
a scanning device configured to scan an identification document;
an identification engine implemented within software executed upon the surface based computing device, where the identification engine is configured to analyze an identification document scanned by the scanning device to determine a validity of the scanned document by comparing features of the scanned identification document against features of an identification document template for a document of a same type as the scanned identification document;
an image capture device configured to capturing an image of a user presenting the identification document, wherein the surface based computing device is configured to compare the image against an image contained in the identification document that has been scanned by the scanning device, wherein a granting of access to the secured resource is based upon comparison results of the captured image and the scanned image; and
a user interface configured to present at least one of a user and a human verification agent with verification results of the analysis performed by the identification verification engine, wherein the verification results are utilized to selectively grant access to a secured resource, wherein the user interface is configured to present a sample image of a valid document of the same type as the identification document to the human verification agent so that the human verification agent is able to compare the sample image against the identification document, wherein said surface based computing device lacks keyboard and mouse peripherals for interactions, wherein said user interface comprises a graphical user interface comprising a detection area for presenting the identification document for scanning and an input mechanism comprising a plurality of user selectable, touch-sensitive keys, each of the keys comprising an alpha-numeric label representing an input character received when a user touches the corresponding key.

16. The surface based computing device of claim 15, further comprising:
a transceiver configured to connect the surface based communication device to a network; and
a content extraction engine configured to extract semantic content from the scanned document, wherein the surface based computing device is configured to retrieve information related to the identification document from a remotely located authority source, to compare the retrieved information against the digitally encoded information from the identification document, and to grant access to the secured resource based upon comparison results of the retrieved information and the extracted semantic content.

17. The surface based computing device of claim 15, wherein the surface based computing device is a Point of Sale (POS) device, wherein the identification document comprises a birth date, and wherein the secured resource is an age restricted resource.

18. The surface based computing device of claim 15, wherein the user interface is configured to prompting the human verification agent responsive to the analyzing the digitally encoded information to examine specific elements of the identification document to validate specific aspects of the identification document that are difficult for automated components of a system to detect, yet that are relatively easy for the human verification agent to discern.

19. A method of granting access to a secured resource based upon verifying an identification document comprising:
identifying an identification document placed on a surface based computing device, wherein the surface based computing device lacks keyboard and mouse peripherals for interactions, wherein said surface based computing device includes a graphical user interface comprising a detection area for presenting the identification document for scanning and an input mechanism comprising a plurality of user selectable, touch-sensitive keys, each of the keys comprising an alpha-numeric label representing an input character received when a user touches the corresponding key, wherein the identification document is placed within the detection area when placed on the surface;
the surface based computing device digitally encoding information from the identification document;
analyzing the digitally encoded information to determine a type of the identification document;
retrieving features for the determined type of identification document from a data store;
comparing the digitally encoded information against the retrieved features to determine a compatibility score;
when the compatibility score exceeds a previously established threshold, verifying the identification document as authentic;
when the compatibility score does not exceed the previously established threshold, determining that the identification document is not verified, wherein verified identification documents are utilized to grant a related user access to a secured resource;
requiring a human verification agent to verify the identification document before granting access to the secured resource;
presenting the human verification agent with verifying instructions for the identification document, wherein said verifying instructions are based upon the retrieved features; and
prompting the human verification agent responsive to the analyzing the digitally encoded information to examine specific elements of the identification document to validate specific aspects of the identification document that are difficult for automated components of a system to detect, yet that are relatively easy for the human verification agent to discern.

* * * * *